(12) United States Patent
Currier et al.

(10) Patent No.: US 10,245,674 B2
(45) Date of Patent: Apr. 2, 2019

(54) SYSTEMS AND METHODS FOR PLASMA GAS VENTING IN A PLASMA ARC TORCH

(71) Applicant: Hypertherm, Inc., Hanover, NH (US)

(72) Inventors: Brian J. Currier, Newport, NH (US); Stephen M. Liebold, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 15/472,493

(22) Filed: Mar. 29, 2017

(65) Prior Publication Data

US 2017/0282279 A1    Oct. 5, 2017

Related U.S. Application Data

(60) Provisional application No. 62/314,658, filed on Mar. 29, 2016.

(51) Int. Cl.
*B23K 10/00* (2006.01)
*H05H 1/28* (2006.01)
*H05H 1/34* (2006.01)

(52) U.S. Cl.
CPC .............. *B23K 10/00* (2013.01); *H05H 1/28* (2013.01); *H05H 1/34* (2013.01)

(58) Field of Classification Search
CPC .......... B23K 10/00; B23K 10/02; H05H 1/34; H05H 1/26; H05H 2201/3457
USPC .............. 219/121.39, 121.45, 121.48, 121.5, 219/121.51, 75
See application file for complete search history.

(56) References Cited

U.S. PATENT DOCUMENTS

| | | | | |
|---|---|---|---|---|
| 4,902,871 A * | 2/1990 | Sanders | ............... | B23K 9/0671 219/121.49 |
| 5,170,033 A * | 12/1992 | Couch, Jr. | ............ | B23K 10/006 219/121.48 |
| 5,886,315 A * | 3/1999 | Lu | ............................ | H05H 1/34 219/121.39 |
| 6,163,009 A * | 12/2000 | Hardwick | .............. | B23K 10/02 219/121.54 |
| 6,403,915 B1 * | 6/2002 | Cook | ....................... | H05H 1/28 219/121.51 |
| 6,919,526 B2 | 7/2005 | Kinerson et al. | | |
| 9,737,954 B2 * | 8/2017 | Hoffa | ................... | B23K 10/006 |
| 2006/0102606 A1 | 5/2006 | Twarog | | |
| 2006/0289396 A1 * | 12/2006 | Duan | ....................... | H05H 1/34 219/121.5 |
| 2010/0078408 A1 * | 4/2010 | Liebold | .................... | H05H 1/28 219/121.5 |
| 2014/0021172 A1 | 1/2014 | Sanders et al. | | |

(Continued)

FOREIGN PATENT DOCUMENTS

WO         93/13905 A1    7/1993

*Primary Examiner* — Mark Paschall
(74) *Attorney, Agent, or Firm* — Proskauer Rose LLP (57) ABSTRACT

A plasma cutting system is provided. The system includes a torch tip having a proximal end and a distal end defining a longitudinal axis extending therethrough. The torch tip includes a plasma plenum and a plasma arc exit orifice located at the distal end of the torch tip. The system includes a lead having a distal end configured for connection to the proximal end of the torch tip. The system also includes an atmospheric vent port disposed between the plasma arc exit orifice and the distal end of the lead. The system further includes a conduit fluidly connecting the plasma plenum and the atmospheric vent port.

21 Claims, 3 Drawing Sheets

(56) References Cited

U.S. PATENT DOCUMENTS

2014/0061170 A1    3/2014   Lindsay et al.
2015/0144603 A1*   5/2015   Shipulski ................ H05H 1/34
                                                                     219/121.49

* cited by examiner

SYSTEMS AND METHODS FOR PLASMA GAS VENTING IN A PLASMA ARC TORCH

CROSS REFERENCE TO RELATED APPLICATION

This application claims the benefit of and priority to U.S. Provisional Patent Application No. 62/314,658, filed Mar. 29, 2016, which is owned by the assignee of the instant application and incorporated herein by reference in its entirety.

TECHNICAL FIELD

The present invention generally relates to systems and methods for plasma gas venting in a plasma arc torch, such as venting through a short path in the torch body.

BACKGROUND

Thermal processing torches, such as plasma arc torches, are widely used for high temperature processing (e.g., heating, cutting, gouging and marking) of materials. A plasma arc torch generally includes a torch head, an electrode mounted within the torch head, an emissive insert disposed within a bore of the electrode, a nozzle with a central exit orifice mounted within the torch head, a shield, electrical connections, passages for cooling, and passages for arc control fluids (e.g., plasma gas). A swirl ring can be used to control fluid flow patterns in the plasma chamber formed between the electrode and the nozzle. In some torches, a retaining cap is used to maintain the nozzle and/or swirl ring in the plasma arc torch. In operation, the torch produces a plasma arc, which is a constricted jet of an ionized gas with high temperature and sufficient momentum to assist with removal of molten metal. Gases used in the torch can be non-reactive (e.g., argon or nitrogen), or reactive (e.g., oxygen or air).

Generally, vented plasma arc torch designs (i.e., plasma arc torches configured to vent away at least a portion of an ionized plasma gas) are employed to achieve improved qualities in cuts of various edges (e.g., square edges, straight edges and/or top edge rounding) and smaller cutting kerfs. Vented plasma arc torch designs can also promote higher cut speeds with minimized dross. However, in view of the harmful effects vented gases can have on a human body and the torch platform itself, safe venting techniques and designs for a plasma arc torch are critical. For example, in cases of venting fuel gases, these gases can form an explosive mixture when exposed to atmosphere, thereby creating hazardous work conditions.

Figure 1:
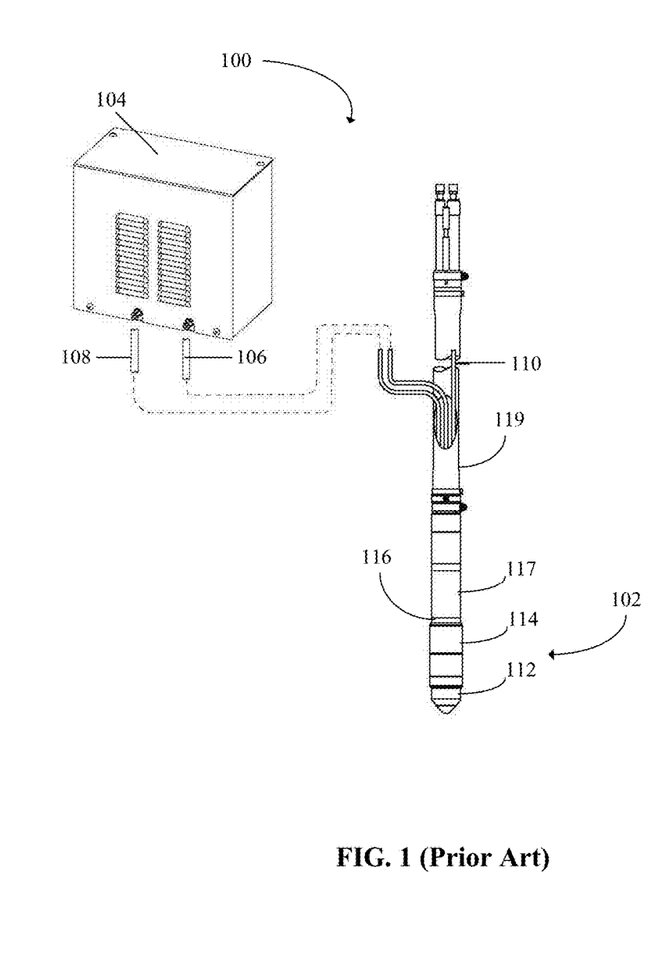
FIG. 1 shows an exemplary prior art plasma arc torch system with traditional gas returning and venting features.
Figure 2:
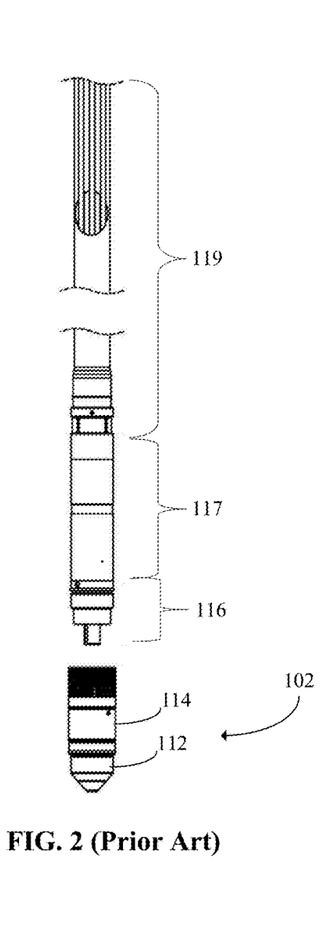
FIG. 2 shows a detailed view of a portion of the prior art plasma arc torch system of FIG. 1.

FIG. 1 shows an exemplary prior art plasma arc torch system 100 with traditional gas returning and venting features. FIG. 2 shows a detailed view of a portion of the plasma arc torch system 100 of FIG. 1. A source of plasma gas (not shown) is provided to a plasma arc torch 102 of the plasma arc torch system 100 through a metering console 104 and a plasma gas delivery mechanism 106 (e.g., a plasma gas supply hose) that is connected between the metering console 104 and the plasma arc torch 102. In some embodiments, a source of shield gas (not shown) is provided to the plasma arc torch 102 through the metering console 104 and a shield gas delivery mechanism 108 (e.g., a shield gas supply hose) that is connected between the metering console 104 and the plasma arc torch 102. The plasma arc torch 102 includes a torch tip 112 at the distal end of the torch 102 and a torch body 114 connected to the proximal end of the torch tip 112. The torch tip 112 includes one or more consumables (e.g., electrode, nozzle, swirl ring and/or shield) that tend to be exposed to the most amount of heat during torch operations. A receptacle 116 is connected to the proximal end of the torch body 114 and configured to connect the plasma gas supply hose 106 to the torch body 114 such that a plasma gas is delivered thereto.

In the prior art torch system 100, the torch 102 is adapted to vent away an ionized plasma gas from the torch tip 112 by flowing the gas proximally via a plasma gas vent hose 110 that extends within a torch lead 119 proximal to the torch receptacle 116. For example, the torch lead 119 can be connected to the receptacle 116 via a mount sleeve 117. A gas return path is adapted to extend from the torch tip 112, over the torch body 114, through the torch receptacle 116 and the mount sleeve 117, and exit from the gas vent hose 110 covering most of the length of the torch lead 119. Specifically, the gas return path allows the plasma gas to exit from the gas vent hose 110 via a braided cover of the torch lead 119.

Figure 3:
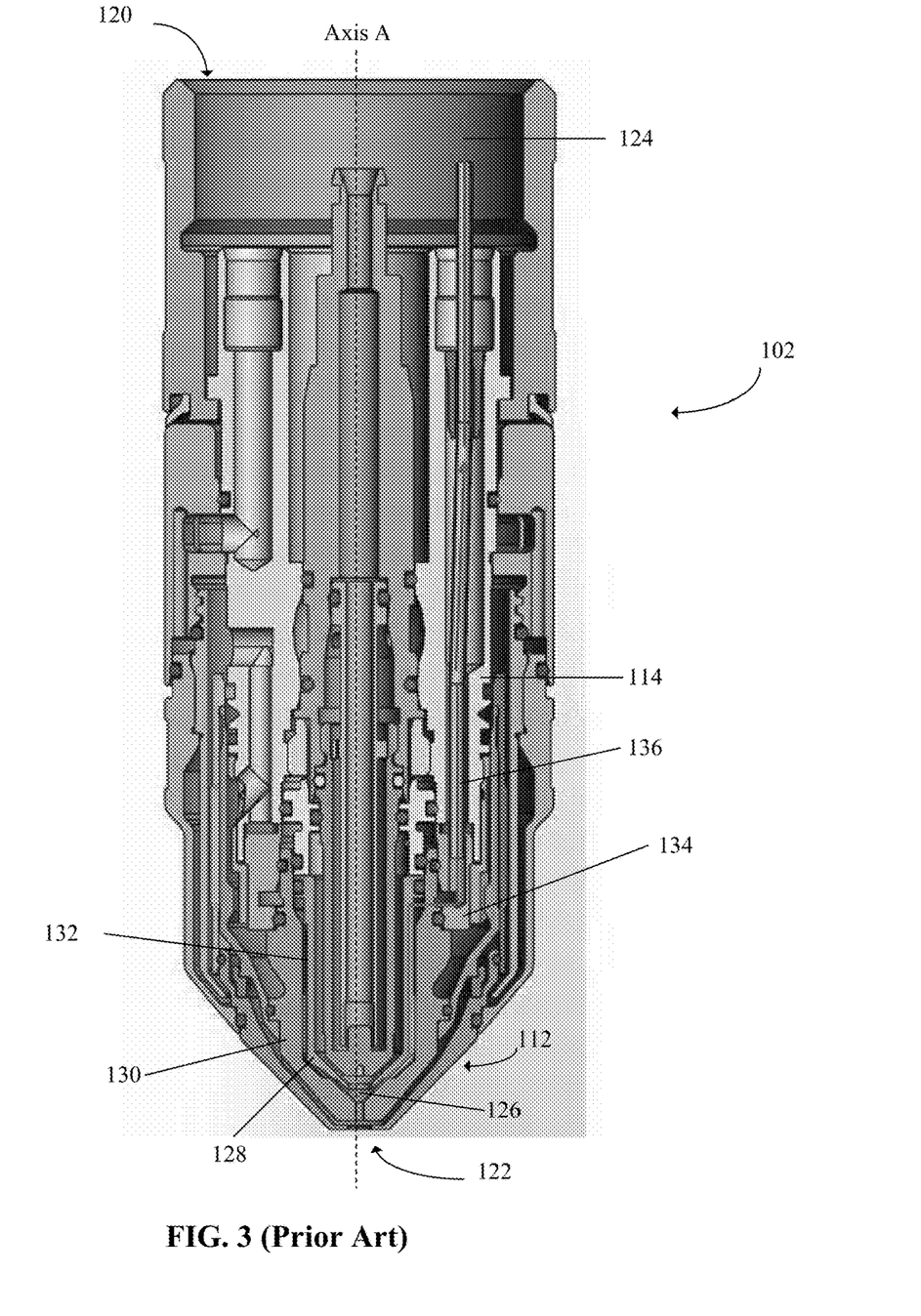
FIG. 3 shows an exemplary design of the plasma arch torch of FIG. 1 oriented to illustrate a prior art plasma gas return path for venting a plasma gas.

FIG. 3 shows an exemplary design of the plasma arch torch 102 of FIG. 1 oriented to illustrate a prior art plasma gas return path 124 for venting a plasma gas proximally through the torch lead 119 of FIG. 2. The plasma arc torch 102 defines a proximal end 120 and a distal end 122 with a longitudinal axis A extending therethrough. Generally, the plasma gas return path 124 allows an ionized plasma gas to travel proximally from the torch tip 112, through the torch body 114 and the torch receptacle 116 of FIGS. 1 and 2, and exit to atmosphere from the torch lead 119. Specifically, as shown in FIG. 3, the plasma gas 124 flows away from a plasma gas chamber 126 of the torch 102 and travels proximally through the torch 102 via a gas passageway 132 defined by an exterior surface of a nozzle liner 128 and an interior surface of the nozzle 130. The gas passageway 132 is fluidly connected to a second gas passageway 136, which is substantially embedded in the torch body 114 and extends along the longitudinal axis A. The second gas passageway 136 is configured to conduct the plasma gas flow 124 proximally through the torch body 114. The second gas passageway 136 allows the plasma gas flow 124 to exit from the proximal end of the torch body 114, through the receptacle 116 and passes into the torch lead 119, from which the plasma gas flow 124 exits to atmosphere. The plasma gas flow 124 can pass about 4 feet through the torch lead 119 before it is vented to atmosphere. In some embodiments, the second gas passageway 136 is in fluid communication with the vent hose 110 of FIGS. 1 and 2 to conduct the plasma gas flow 124 through the receptacle 116 prior to venting the gas flow 124 from the torch lead 119.

For the plasma arc torch system design of FIGS. 1, 2, and 3, customers are typically advised to locate the exposed end of the plasma gas vent hose 110 (i.e., the end that is exposed to atmosphere) away from any sparks. They are also advised not to obstruct the plasma vent hose 110, as it may significantly affect cut quality and consumable life. Further, customers are advised not to route the plasma gas vent hose 110 inside any consoles or electronic circuitry, as the gas from the hose 110 can contribute to a combustion friendly environment. Despite these instructions, the return gas path design of FIGS. 1, 2 and 3 is still susceptible to inadvertent user errors, negligence and/or malfunction.

Therefore, systems and methods are needed to provide optimized gas venting in a plasma arc torch to improve the safety of the torch and reduce environmental risks.

SUMMARY

The present invention provides a plasma arc torch design with a reduced gas venting path in the torch body and an altered vent location when compared to traditional torch designs, such as the design illustrated in FIGS. 1-3. For example, the gas venting path of the present invention need not extend into the torch receptacle and includes a vent port that is configured to vent an ionized plasma gas radially outward from a side of the torch.

In one aspect, a plasma cutting system is provided. The system includes a torch tip having a proximal end and a distal end defining a longitudinal axis extending therethrough. The torch tip includes a plasma plenum and a plasma arc exit orifice located at the distal end of the torch tip. The system also includes a lead having a distal end configured for connection to the proximal end of the torch tip. The system additionally includes an atmospheric vent port disposed between the plasma arc exit orifice and the distal end of the lead. The atmospheric vent port has an outer opening exposed to atmosphere. The system further includes a conduit fluidly connecting the plasma plenum and the atmospheric vent port. The conduit comprises (i) a first channel configured to direct a portion of ionized gas from the plasma plenum in a first direction axially away from the plasma arc exit orifice, and (ii) a second channel, fluidly connected between the first channel and the atmospheric vent port, configured to direct the portion of ionized gas from the first channel to the atmospheric vent port.

In some embodiments, the plasma cutting system further includes a third channel between the first channel and the plasma arc exit orifice. The third channel is configured to direct a second portion of ionized gas in a second direction axially toward the plasma arc exit orifice. In some embodiments, the first channel has a first length and the third channel has a third length that is less than the first length. A ratio of the first length to the third length is greater than about 2.

In some embodiments, the atmospheric vent port is defined by a gap between the proximal end of the torch tip and a receptacle.

In some embodiments, a distance between the plasma arc exit orifice and the atmospheric vent port along the longitudinal axis is less than 8 inches, such as about 3 inches.

In another aspect, a torch for a plasma cutting system is provided. The torch includes a torch tip defining a plasma plenum and a plasma arc exit orifice. The torch also includes a torch body comprising a proximal end configured to connect to a power supply and a distal end configured to connect to the torch tip. The proximal end and the distal end of the torch body have a longitudinal axis extending therethrough. The torch body also includes a plasma gas source channel within the torch body fluidly connected to at least one gas port at the distal end of the torch body. The torch further includes a set of fluid conduits in the torch tip fluidly connected to the at least one gas port of the torch body and the plasma plenum. The set of fluid conduits include a first channel, a second channel, and an atmospheric vent port defined by a gap between the torch tip and the torch body. The first channel is configured to direct a portion of plasma gas from the plasma plenum in a first direction along the longitudinal axis axially away from the plasma arc exit orifice and the second channel is configured to direct the portion of plasma gas in a second direction along the longitudinal axis axially toward the exit orifice and exit through the atmospheric vent port.

In some embodiments, the first channel has a first length and the second channel has a second length that is less than the first length. For example, a ratio of the first length to the second length is greater than about 2. In some embodiments, the first channel and the second channel are substantially internal to the torch body and the torch tip.

In some embodiments, a vent port is absent from the proximal end of the torch body.

In some embodiments, the atmospheric vent port is shaped to direct the gas radially outward in a direction substantially perpendicular to the longitudinal axis of the torch body. In some embodiments, a distance between the plasma arc exit orifice and the atmospheric vent port along the longitudinal axis is less than about 8 inches.

In yet another aspect, a plasma cutting system is provided. The system includes a torch tip defining a plasma plenum and a plasma arc exit orifice. The torch tip has a proximal end and a distal end defining a longitudinal axis extending therethrough. The plasma arc exit orifice is located at the distal end of the torch tip. The system also includes a power supply having a distal end configured to connect to the proximal end of the torch tip. The system additionally includes an atmospheric vent orifice having an outer opening in direct communication with atmosphere. A distance between the plasma arc exit orifice and the atmospheric vent port along the longitudinal axis is less than about 8 inches. The system further includes a first channel and a second channel. The first channel fluidly connected to the plasma plenum. The first channel is shaped to direct an ionized gas in a proximal direction along the longitudinal axis axially away from the plasma arc exit orifice. The second channel is fluidly connected between the first channel and the atmospheric vent orifice. The second channel is shaped to direct the ionized gas out of the plasma cutting system to atmosphere.

In some embodiments, the system further includes a third channel between the first channel and the plasma arc exit orifice. The third channel is shaped to direct an ionized gas flow in a distal direction along the longitudinal axis axially toward the plasma arc exit orifice. In some embodiments, the first channel has a first length and the third channel has a third length less than the first length. For example, a ratio of the first length to the third length is greater than about 2.

In some embodiments, the atmospheric vent orifice is shaped to direct the gas radially outward in a direction substantially perpendicular to the longitudinal axis of the torch body.

In some embodiments, the atmospheric vent orifice is disposed between the proximal end of the torch tip and the power supply. In some embodiments, the atmospheric vent orifice is defined by a gap between the proximal end of the torch tip and a receptacle.

In yet another aspect, a plasma cutting system is provided. The system includes a torch tip having a proximal end and a distal end defining a longitudinal axis extending therethrough. The torch tip includes a plasma plenum and a plasma arc exit orifice located at the distal end of the torch tip. The system includes a lead having a distal end configured for connection to the proximal end of the torch tip. The system also includes a venting means disposed between the plasma arc exit orifice and the distal end of the lead. The venting means is configured to conduct a plasma gas flow to atmosphere. The system further includes a conduit means fluidly connecting the plasma plenum and the venting means. The conduit means includes (i) a first channel means configured to direct a portion of ionized gas from the plasma plenum in a first direction axially away from the plasma arc exit orifice, and (ii) a second channel means, fluidly connected between the first channel means and the venting means, configured to direct the portion of ionized gas from the first channel means to the venting means.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 4:
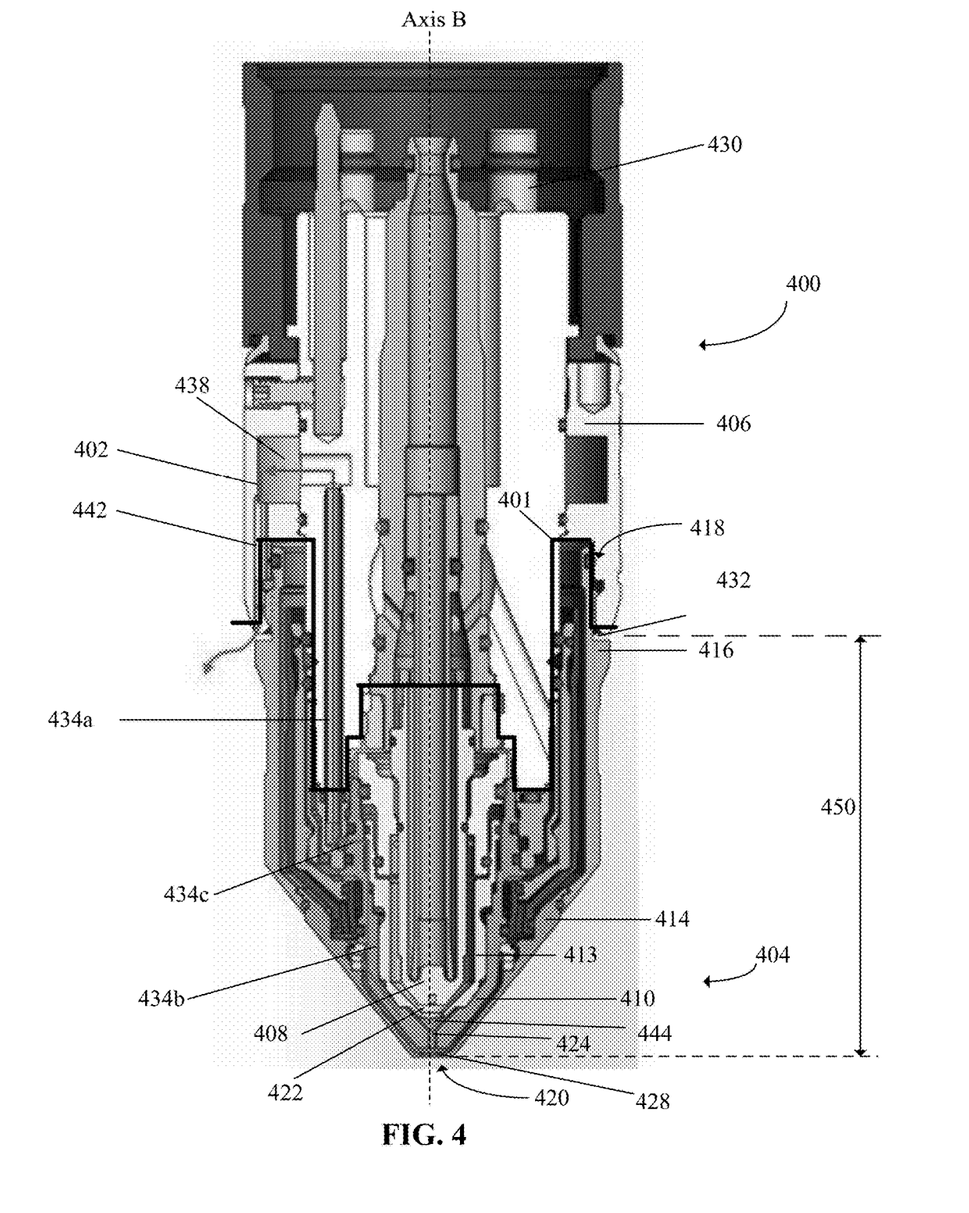
FIG. 4 shows an exemplary plasma arc torch with a reduced gas return path, according to an illustrative embodiment of the invention.

FIG. 4 shows an exemplary plasma arc torch 400 with a reduced plasma gas return/vent path 402, according to an illustrative embodiment of the invention. The plasma gas return path 402 is configured to be shorter than the prior art plasma gas return path 124 of FIG. 3. For example, in some embodiments, the plasma gas return path 402 routes a plasma gas from/through the torch tip 404 and the distal end of the torch body 406, but not through a receptacle (not shown, but similar to the receptacle 116 of FIGS. 1 and 2) or the proximal end of the torch body 406. In some embodiments, the plasma arc torch 400 vents a plasma gas radially outward through the torch body 406, without venting through the receptacle.

As shown in FIG. 4, the boundary between the torch tip 404 and the torch body 406 of the plasma arc torch 400 is approximately delineated by the line 401. The torch tip 404 has a proximal end 418 and a distal end 420 defining a longitudinal axis B extending therethrough. The torch tip 404 comprises one or more consumables, including an electrode 408, a nozzle 410, a nozzle liner 413 and a shield 414. The torch tip 404 also includes a consumable retaining cap 416 configured to retain the torch tip 404 to the torch body 406. The torch tip 404 further includes a plasma chamber/plenum 422 defined, at least in part, by the distal end of the electrode 408 and the nozzle 410, which is situated in a spaced relationship from the electrode 408. The nozzle 410 includes a nozzle exit orifice 424. The retaining cap 416 secures the shield 414 to the torch body 406, where the shield 414 defines a central shield exit orifice 428 at the distal end 420 of the torch tip 404. The nozzle exit orifice 424 and optionally, the shield exit orifice 428 at the distal end 418 of the torch tip 404 defines a plasma arc exit orifice configured to introduce a plasma arc to a workpiece in a processing operation.

The plasma arc torch 400 also includes the torch body 406 that has a proximal end configured to connect to a power supply (not shown), such as via the torch receptacle and a torch lead (not shown, but similar to the torch lead 119 of FIGS. 1 and 2), and a distal end configured to connect to the torch tip 404. The torch body 406 is substantially aligned with the torch tip 404 such that the longitudinal axis B extends through the torch body 406 through its proximal and distal ends. The torch lead can be a wire or hose that connects the torch body 406 to the power supply. Specifically, the torch lead has a distal end connected to the proximal end of the torch body 406 via the receptacle and a mount sleeve (not shown, but similar to the mount sleeve 117 of FIGS. 1 and 2). Hence, the receptacle is located at the distal end of the lead (i.e., opposite of the power supply) and the receptacle matingly engages the proximal end of the torch body 406.

In some embodiments, a source of plasma gas is supplied to an inlet of a plasma gas source channel 430 of the torch body 406, where the inlet is located at the proximal end of the torch body 406. An outlet of the plasma gas source channel 430, which is at the distal end of the torch body 406, is fluidly connected to a corresponding plasma gas source channel (not shown) in the torch tip 404. The plasma gas source channels in the torch body 406 and the torch tip 404 are configured to conduct a plasma gas from the plasma gas source to flow distally to the torch tip 404, such as to the plasma chamber 422 of the torch tip 404. The plasma gas in the plasma chamber 422 can be ionized.

In some embodiments, the plasma arc torch 400 includes an atmospheric vent orifice/port 432 that comprises an outer opening exposed to atmosphere, such that at least a portion of the ionized plasma gas in the plasma chamber 422 is vented to atmosphere via the outer opening of the port 432. The atmospheric vent port 432 is generally located between the plasma arc exit orifice (i.e., comprising the nozzle exit orifice 424 and optionally, the shield exit orifice 428) and the power supply. For example, in the embodiment of FIG. 4, the atmospheric vent port 432 is located between the plasma arc exit orifice and the distal end of the lead that connects the power supply to the torch body 406. In some embodiments, the atmospheric vent port 432 is defined by a gap between the proximal end 418 of the torch tip 404 and the receptacle, but the atmospheric vent port 432 does not extend into the receptacle. In some embodiments, the atmospheric vent port 432 is defined by a gap between the proximal end 418 of the torch tip 404 and the distal end of the torch body 406, such as between the retaining cap 416 and the distal end of the torch body 406. The atmospheric vent port 432 is generally absent from the proximal end of the torch body 406. In some embodiments, a distance 450 between the plasma arc exit orifice (i.e., the distal end 420 of the torch tip 404) and the atmospheric vent port 432 along the longitudinal axis B is less than about 8 inches, such as less than about 3 inches. In contrast, in a typical prior art torch, such as the torch 102 illustrated in FIG. 3, the plasma gas return path 124 is about 54 inches In some embodiments, the plasma arc torch 400 includes one or more vent channels/conduits forming plasma gas return path 402 configured to vent a portion of the ionized plasma gas in the plasma chamber 422 to atmosphere. A least a portion of the plasma gas return path 402 is fluidly connected between the plasma chamber 422 and the atmospheric vent port 432. In some embodiments, the plasma gas return path 402 comprises (i) a first channel 434 having a proximal segment 434a and a distal segment 434b, and (ii) a second channel 442. In some embodiments, the first and second channels 434, 442 are substantially internal to the torch body 406 and/or the torch tip 404.

In some embodiments, the distal segment 434b of the first channel 434 is defined by an interior surface of the nozzle 410 and an exterior surface of the nozzle liner 413. The distal segment 434b, in fluid communication with the plasma chamber 422, is adapted to conduct the plasma gas axially (i.e., along the longitudinal axis B) away from the plasma chamber 422 and the plasma arc exit orifice in a proximal direction (i.e. toward the proximal end 418 of the torch tip 404).

The proximal segment 434a of the first channel 434, in fluid communication with the distal segment 434b, is adapted to further conduct the plasma gas axially away from the plasma chamber 422 in the proximal direction. In some embodiments, the proximal segment 434a conducts the plasma gas flow from the distal segment 434b into a cavity 438 of the torch body 406. In some embodiments, the proximal segment 434a is substantially embedded in the torch body 406 and extends along a length of the torch body 406 substantially parallel to the longitudinal axis B. In some embodiments, the first channel 434 further includes a connecting channel segment 434c between the proximal segment 434a and the distal segment 434b configured to introduce the ionized gas flow from the distal segment 434b to the proximal segment 434a. The connecting channel segment 434c can be substantially perpendicular to the longitudinal axis B to conduct the gas flow in a radial direction with respect to the longitudinal axis B. One or more alternative orientations of the connecting channel segment 434c are possible. For example, the connecting channel segment 434c can be oriented diagonally with respect to the the longitudinal axis B.

In some embodiments, the second channel 442 of the return path 402 is fluidly connected between the first channel 434 (e.g. at the cavity 438 of the torch body 406) and the atmospheric vent port 432 to direct the plasma gas flow from the first channel 434 to the atmospheric vent port 432, from which the gas flow is vented to atmosphere. The second channel 442 is adapted to be formed between an inner surface of the torch body 406 and an outer surface of the proximal end of the retaining cap 416. In some embodiments, the second channel 442 is configured to direct the plasma gas flow axially (i.e., along the longitudinal axis B) to the atmospheric vent port 432 in a distal direction (i.e., toward the distal end 420 of the torch tip 404). In some embodiments, the atmospheric vent port 432 is configured to direct the gas radially outward in a direction substantially perpendicular to the longitudinal axis B.

In some embodiments, the first and second channels 434, 442 form the plasma gas return path 402 that is substantially U-shaped in cross section in a plane parallel to the longitudinal axis B. As explained above, the first channel 434 is configured to conduct the plasma gas axially through the torch 400 in a proximal direction and the second channel 442 is configured to conduct the plasma gas axially through the torch 400 in a distal direction before the gas is vented to atmosphere. One advantage of the plasma gas return path 402 having a U-shape is that if the atmospheric vent port 432 is exposed to liquid (e.g., water), the liquid is unlikely to reach the plasma chamber 422 because the liquid would first need to flow in a proximal direction (i.e., upward against gravity) through the second channel 442 of the plasma gas return path 402 before it can flow distally through the first channel 434 to reach the plasma chamber 422.

In some embodiments, the plasma gas return path 402 includes a third channel 444 between the plasma chamber 422/first channel segment 434 and the plasma arc exit orifice. The third channel 444 is configured to direct a portion of the ionized plasma gas in the plasma chamber 422 axially toward the plasma arc exit orifice in the distal direction. The portion of the ionized gas in the third channel 444 is adapted to exit to atmosphere via the plasma exit orifice.

In some embodiments, the length of the first channel 434 is greater than the length of the third channel 444. For example, the ratio of the length of the first channel 434 to the length of the third channel 444 is greater than about 2. In some embodiments, the length of the first channel 434 is greater than the length of the second channel 442. For example, the ratio of the length of the first channel 434 to the length of the second channel 442 is greater than about 2.

As explained above, the plasma gas return path 402 is generally shorter than a prior art plasma gas return path, such as the plasma gas return path 124 of FIG. 3. Specifically, the plasma gas return 124 of the prior art system extends from the torch tip 112 to the receptacle 116, whereas the plasma gas return path 402 extends from the torch tip 404 to the distal end of the torch body 406. For example, the atmospheric vent port 432 is located on a side of the torch body 406, instead of extending beyond the proximal end of the torch body 406 and into the receptacle. Such a design is advantageous because it creates space in the receptacle for additional functionalities. Another advantage is that the location of the vent of the present design allows an existing cut table ventilation system to be easily connected thereto, which facilitates the removal of harmful plasma and/or metal fumes exhausted from the torch. In addition, this design allows gas venting to occur further away from the operator in comparison to the plasma gas return path 124 of FIG. 3. In addition, the present design ensures that gas venting occurs away from the operator because the operator is not near the torch. In contrast, prior art torches typically route the gas hose close to the operator. Further, the present design is adapted to reduce assembly parts, such as reducing the number of tubing and/or connections needed, thereby reducing the occurrence of assembly errors. For example, the present design eliminates the need for a vent tube through the receptacle. Additionally, because venting is done through a side of the torch body 406, it eliminates the possibility of an operator accidentally unplugging the vent tube from the back (i.e., proximal end) of the torch or connecting the vent tube to an undesirable location. Overall, the present design increases cut quality, prevents loss of consumable life, and improves system reliability as the design limits the number of torch parts exposed to corrosive vent gases.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A plasma cutting system comprising:
   a torch body having a proximal end and a distal end defining a longitudinal axis extending therethrough;
   a torch tip having a proximal end and a distal end, the torch tip located at the distal end of the torch body and including a plasma plenum and a plasma arc exit orifice located at the distal end of the torch tip;
   a lead connector disposed on the proximal end of the torch body and connectable to a torch lead at the proximal end of the torch body, the torch lead having a proximal end and a distal end;
   an atmospheric vent port from the plasma plenum and disposed between the plasma arc exit orifice and the distal end of the torch lead, the atmospheric vent port having an outer opening exposed to atmosphere, the outer opening disposed upstream of the proximal end of the torch tip and downstream of the distal end of the torch lead; and
   a conduit fluidly connecting the plasma plenum and the atmospheric vent port, the conduit comprising:

a first channel configured to direct a portion of ionized gas from the plasma plenum in a first direction axially away from the plasma arc exit orifice; and a second channel, fluidly connected between the first channel and the atmospheric vent port, configured to direct the portion of ionized gas from the first channel to the atmospheric vent port.

2. The plasma cutting system of claim 1, wherein a distance between the plasma arc exit orifice and the atmospheric vent port along the longitudinal axis is less than 8 inches.

3. The plasma cutting system of claim 1, further comprising a third channel between the first channel and the plasma arc exit orifice, the third channel configured to direct a second portion of ionized gas in a second direction axially toward the plasma arc exit orifice.

4. The plasma cutting system of claim 3, wherein the first channel has a first length and the third channel has a third length that is less than the first length.

5. The plasma cutting system of claim 4, wherein a ratio of the first length to the third length is greater than about 2.

6. The plasma cutting system of claim 1, wherein the atmospheric vent port is defined by a gap between the proximal end of the torch tip and a receptacle, the receptacle located along the longitudinal axis and at the distal end of the torch lead.

7. A torch for a plasma cutting system, the torch comprising:
   a torch tip defining a plasma plenum and a plasma arc exit orifice;
   a torch body, including:
      a proximal end configured to connect to a power supply,
      a distal end configured to connect to the torch tip, the proximal end and the distal end having a longitudinal axis extending therethrough; and
      a plasma gas source channel within the torch body fluidly connected to at least one gas port at the distal end of the torch body; and
   a set of fluid conduits in the torch tip fluidly connected to the at least one gas port of the torch body and the plasma plenum, the set of fluid conduits including a first channel, a second channel, and an atmospheric vent port from the plasma plenum and defined by a gap between the torch tip and the torch body,
   wherein the first channel is configured to direct a portion of plasma gas from the plasma plenum in a first direction along the longitudinal axis axially away from the plasma arc exit orifice and the second channel is configured to direct the portion of plasma gas in a second direction along the longitudinal axis axially toward the exit orifice and exit through the atmospheric vent port.

8. The torch of claim 7, wherein the atmospheric vent port is shaped to direct the gas radially outward in a direction substantially perpendicular to the longitudinal axis of the torch body.

9. The torch of claim 7, wherein the first channel has a first length and the second channel has a second length that is less than the first length.

10. The torch of claim 9, wherein a ratio of the first length to the second length is greater than about 2.

11. The torch of claim 7, wherein the first channel and the second channel are substantially internal to the torch body and the torch tip.

12. The torch of claim 7, wherein a vent port is absent from the proximal end of the torch body.

13. The torch of claim 7, wherein a distance between the plasma arc exit orifice and the atmospheric vent port along the longitudinal axis is less than about 8 inches.

14. A plasma cutting system, comprising:
   a torch tip defining a plasma plenum and a plasma arc exit orifice, the torch tip having a proximal end and a distal end defining a longitudinal axis extending therethrough, wherein the plasma arc exit orifice is located at the distal end of the torch tip;
   a power supply having a distal end configured to connect to a torch body, the torch body connectable to the proximal end of the torch tip;
   an atmospheric vent orifice from the plasma plenum and having an outer opening in direct communication with atmosphere, wherein a distance between the plasma arc exit orifice and the atmospheric vent port along the longitudinal axis is less than about 8 inches;
   a first channel fluidly connected to the plasma plenum, the first channel shaped to direct an ionized gas in a proximal direction along the longitudinal axis axially away from the plasma arc exit orifice; and
   a second channel fluidly connected between the first channel and the atmospheric vent orifice, the second channel shaped to direct the ionized gas out of the plasma cutting system to atmosphere.

15. The plasma cutting system of claim 14, further comprising a third channel between the first channel and the plasma arc exit orifice, the third channel shaped to direct an ionized gas flow in a distal direction along the longitudinal axis axially toward the plasma arc exit orifice.

16. The plasma cutting system of claim 15, wherein the first channel has a first length and the third channel has a third length less than the first length.

17. The plasma cutting system of claim 16, wherein a ratio of the first length to the third length is greater than about 2.

18. The plasma cutting system of claim 14, wherein the atmospheric vent orifice is shaped to direct the gas radially outward in a direction substantially perpendicular to the longitudinal axis of the torch body.

19. The plasma cutting system of claim 14, wherein the atmospheric vent orifice is disposed between the proximal end of the torch tip and the power supply.

20. The plasma cutting system of claim 14, wherein the atmospheric vent orifice is defined by a gap between the proximal end of the torch tip and a receptacle, the receptacle located along the longitudinal axis and configured to matingly engage with the torch body.

21. A plasma cutting system comprising:
   a torch body having a proximal end and a distal end defining a longitudinal axis extending therethrough;
   a torch tip having a proximal end and a distal end, the torch tip located at the distal end of the torch body and including a plasma plenum and a plasma arc exit orifice located at the distal end of the torch tip;
   a lead connector disposed on the proximal end of the torch body and connectable to a torch lead at the proximal end of the torch body, the torch lead having a proximal end and a distal end;
   a venting means from the plasma plenum and disposed between the plasma arc exit orifice and the distal end of the torch lead, the venting means configured to conduct a plasma gas flow to atmosphere and having an outer opening disposed upstream of the proximal end of the torch tip and downstream of the distal end of the torch lead; and
   a conduit means fluidly connecting the plasma plenum and the venting means, the conduit means comprising:

a first channel means configured to direct a portion of ionized gas from the plasma plenum in a first direction axially away from the plasma arc exit orifice; and a second channel means, fluidly connected between the first channel means and the venting means, configured to direct the portion of ionized gas from the first channel means to the venting means.

* * * * *